June 1, 1943.  R. C. JIMÉNEZ  2,320,821
ECONOMIZING FLUID FUEL COMBUSTION SYSTEM AND METHOD
Filed July 17, 1940  4 Sheets-Sheet 1
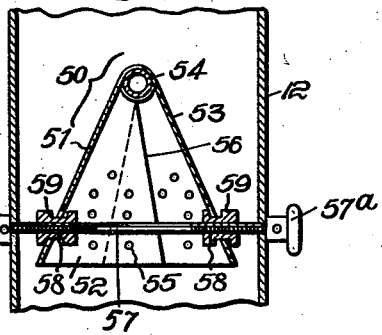
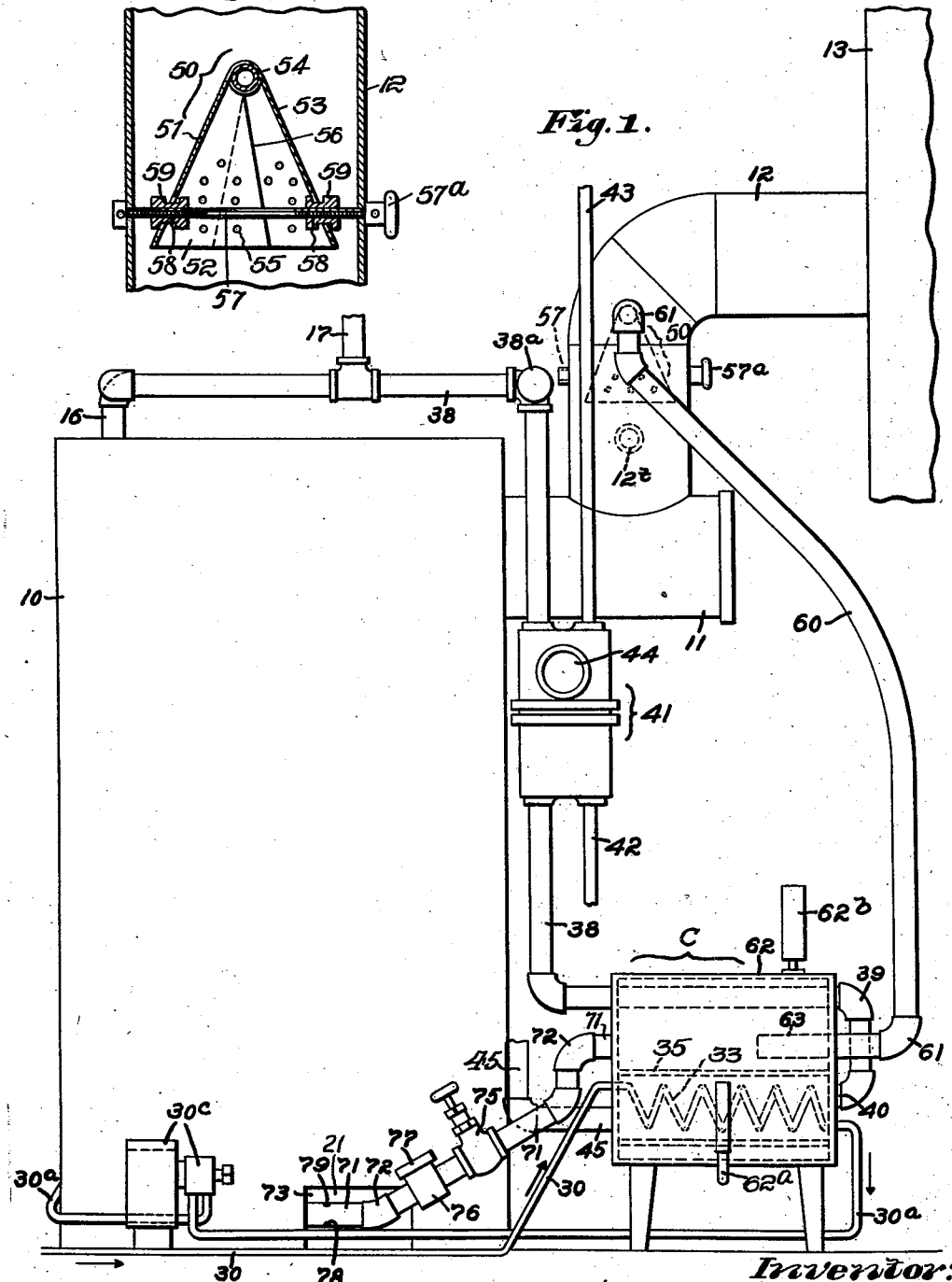
Inventor:
Ramón Castro Jiménez,
By Emery, Booth, Townsend, Miller & Weidner
Att'ys.

Inventor:
Ramón Castro Jiménez,
by Emery, Booth, Townsend, Miller + Weidner
Attys.

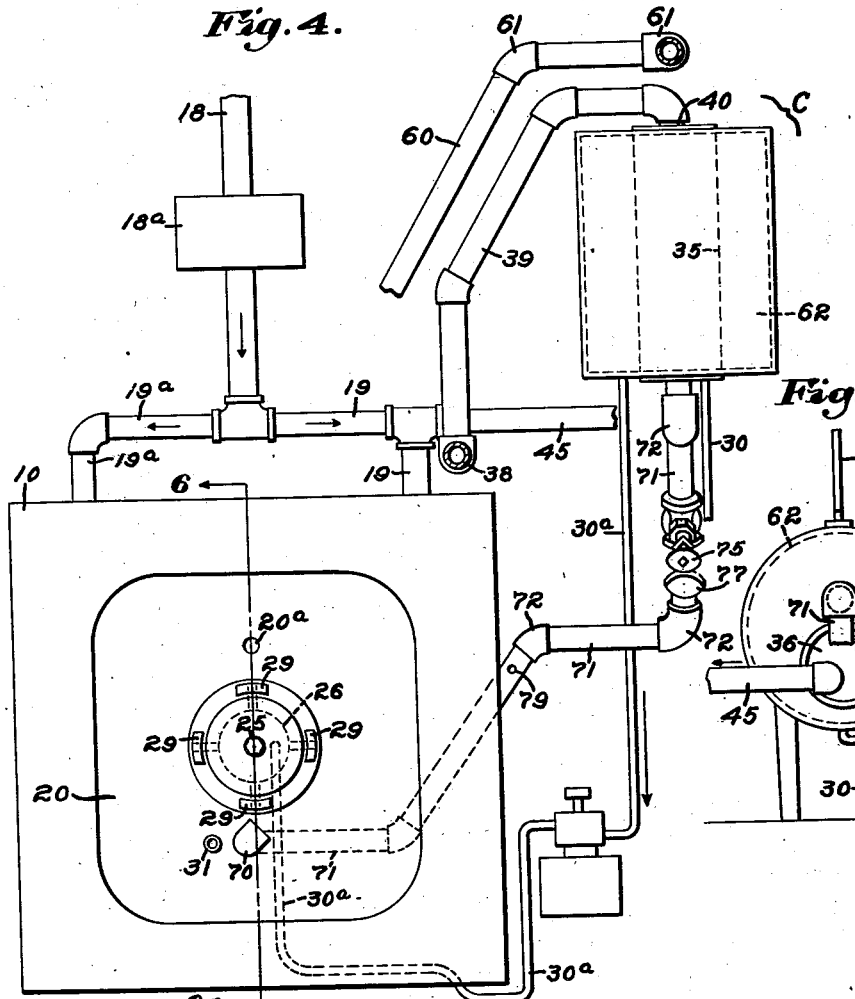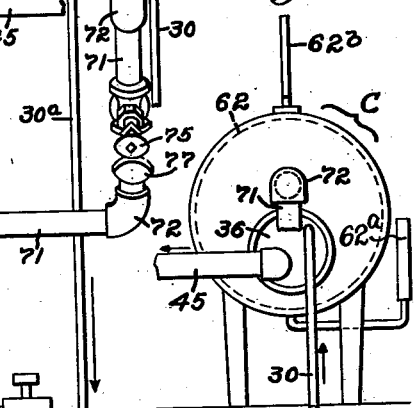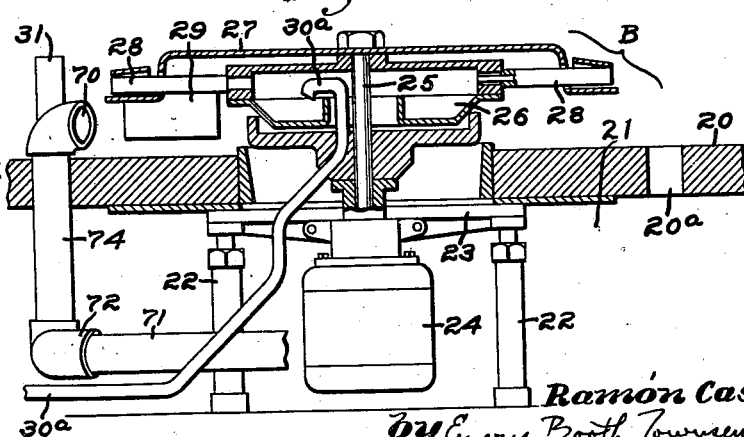

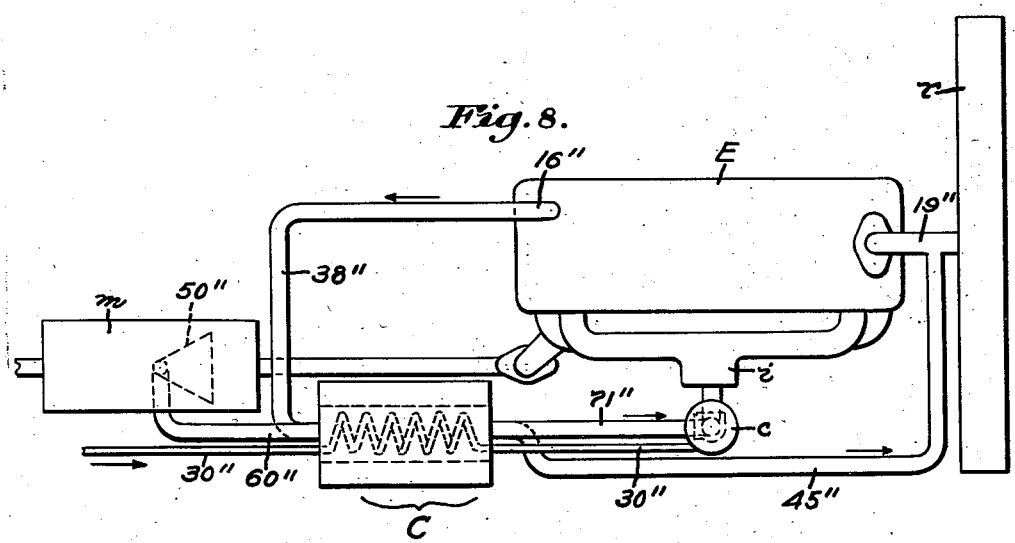
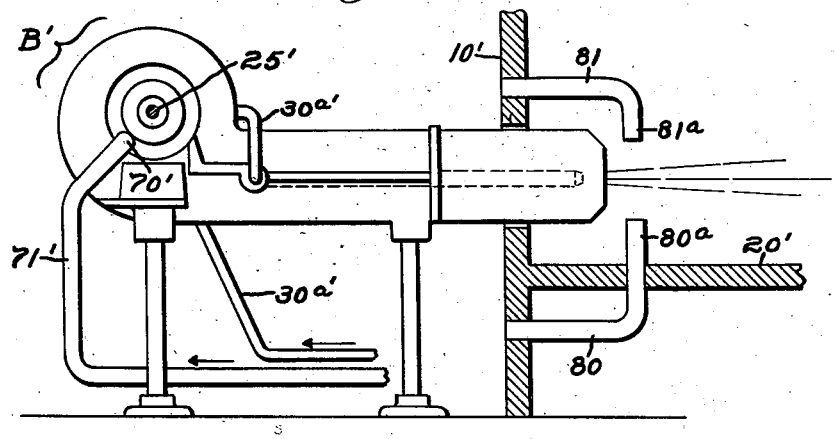
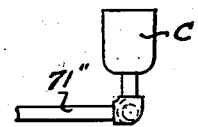
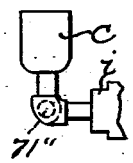

Patented June 1, 1943

2,320,821

UNITED STATES PATENT OFFICE 2,320,821

ECONOMIZING FLUID FUEL COMBUSTION SYSTEM AND METHOD

Ramón Castro Jiménez, Winthrop, Mass.

Application July 17, 1940, Serial No. 345,966

11 Claims. (Cl. 158—36)

My present invention relates to the general class of heating, heat-exchange and power-supplying apparatus wherein the combustion of fluid fuel is accompanied by the giving off of exhaust gases of combustion, including for example oil burner heating systems and internal combustion engines. More particularly the invention aims by novel methods and means to improve the combustion efficiency and to reduce the fuel consumption for a given result, together with other economies and benefits which will be apparent from the following disclosure and claims.

In the drawings illustrating one example of means embodying the invention and for practicing its method, as in an oil burner heating system, Fig. 1 is a side elevational view of an oil burning furnace or boiler installation exemplifying my system, as suitable for domestic and other building heating purposes;

Fig. 1a is a sectional view of a portion of the stack, on a larger scale, to show an adjustable gas-trapping or collecting device included in the system;

Fig. 4 is a further view of the apparatus of Figs. 1 and 2, partly in plan and partly in horizontal section at a level just above the conditioning chest and with the upper portion of the boiler removed to expose the fire-pot and associated burner parts at the combustion locality;

Fig. 5 is a front end elevation of the conditioning chest, on the scale of Figs. 1, 2 and 4;

Fig. 6 is an enlarged vertical sectional view substantially on the line 6—6 of Fig. 4, looking toward the left in said figure, showing a typical rotary oil burner unit and certain associated means according to the invention, including particularly that for delivering a specially conditioned combustion gas mixture to the burner;

Fig. 7, corresponding to Fig. 6, shows the means of my invention as in the preceding figures but associated with an oil burner of the so-called gun type;

Fig. 8 is a diagrammatic plan view illustrating an application of my invention to an internal combustion engine such as that of an automobile; and Figs. 8a and 8b are side and front elevations respectively of a portion of the system of Fig. 8.

Figure 2:
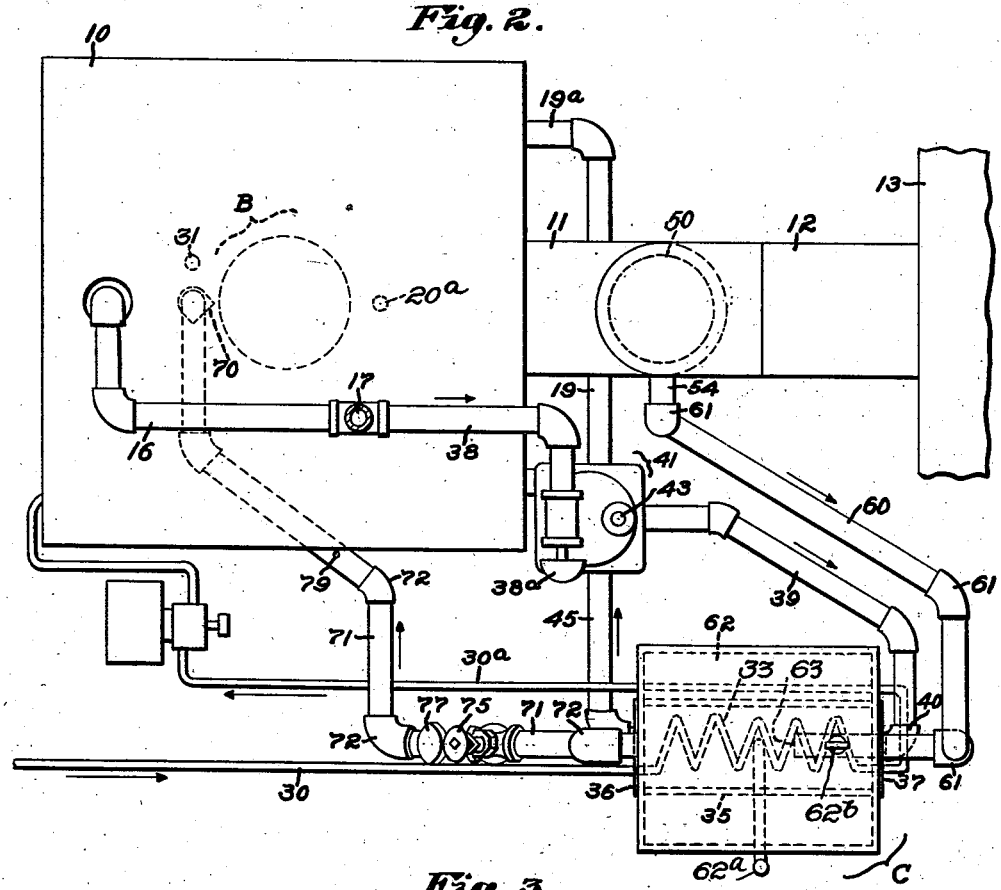
Fig. 2 is a top plan of the apparatus of Fig. 1.

Referring to the drawings in more detail, and first to Figs. 1 and 2, I have there represented a typical modern boiler or furnace 10 having the usual provision for escape of the exhaust gases and products of combustion, including a breeching 11 and communicating stack 12 leading to a flue 13. While the invention is equally adaptable to heating or air-conditioning apparatus of any of the various types, including those wherein the circulating or heat-exchange medium may be steam, vapor, water or air, I have here chosen to illustrate it in connection with a hot-water radiation heating system such as commonly used for heating dwellings and other buildings.

The water or circulating medium for this radiation system is heated in the boiler or furnace 10 through which it is circulated in the usual coils, cores, boiler sections and internal piping connections, not necessary here to show. The heated water passes from the boiler through outlet piping 16 at the upper part thereof, see Figs. 1 and 2, communicating with one or more riser pipes such as 17 leading to the radiation system. The heat-supplying water is returned for reheating as through the return conduit 18, Fig. 4, communicating through branching return inlet pipes 19, 19a with the above-mentioned heating coils and associated water compartments in the boiler 10. An impeller or circulation-maintaining device may be provided, as indicated at 18a, Fig. 4.

The heating source for the boiler is represented as an oil burner unit indicated as a whole by the reference letter B, seen separately in Fig. 6. The invention is readily adaptable for use with any of the known types of oil burners, including the so-called gun type. For the purposes of illustration I have here shown a so-called rotary burner installation. To avoid unnecessary detailed illustration and description of what may be standard equipment, it may be assumed that the boiler and the associated oil burner unit are of a standard commercial construction, for example, as represented by the Timken equipment known in the trade as model C.

As seen in Fig. 6 and also in Fig. 4, a combustion chamber is provided at the lower portion of the furnace or boiler assembly, said chamber including a flooring 20 of fire-brick, clay or other suitable refractory or heat-resistant material. This flooring is disposed at a level above the cellar floor or other foundation adequate to provide a pit 21. The base of the burner unit, including supports 22 and framing 23, is disposed in the pit, the burner power unit or motor 24 being hung on the burner frame or platform 23, with its rotor axis disposed vertically. The motor shaft 25 is extended upwardly above the combustion chamber floor 20.

The rotary elements of the burner unit are concentrically disposed at the upper end of said motor shaft 25, the latter rotating in the counterclockwise direction as viewed in Fig. 4. Said elements include an annular cup 26 to which the incoming fluid fuel or oil is supplied from the fuel line 30a, a top plate 27, a series of radially disposed discharge members 28 for the atomized or vaporized fuel, and a circumferential series of vanes or fan elements 29. These latter in accordance with the invention are specially shaped and arranged for a purpose to be described. The combustion chamber floor 20 is provided with one or more through apertures of customary size, one of which is seen at 20a in Figs. 4 and 6, for admitting atmospheric air to the combustion chamber. In addition I desirably provide in accordance with the invention a supplemental air inlet 31 comprising an upright tubular member or short section of pipe of suitable heat-resistant metal or other material. This supplemental air inlet is mounted in a through aperture in the combustion chamber floor 20 and is extended above the latter to or adjacent the combustion level so as to discharge in calculated relation to the rotary burner mechanism and to the discharge outlet 70 for the returning gaseous admixture to be more fully described. In this manner an adequate supply of oxygen to support combustion is assured in the region of the fuel delivery.

In my system and method the fluid fuel (which may be any of the usual fuel oils, in the illustrated example) is pre-heated. The pre-heating of fuel oil, per se, is known, but in accordance with my invention preheating of the fuel is accomplished in a novel manner and in new association with other features, with the various improved results, as will be apparent.

Figure 3:
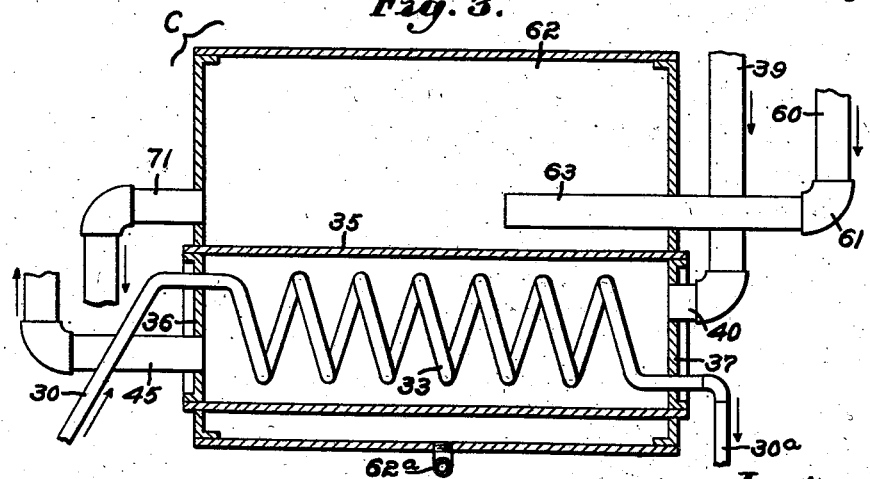
Fig. 3 shows in vertical section, on a somewhat larger scale than in Figs. 1 and 2, a plural-chambered conditioning chest or retort comprised in the system.

Referring more particularly to Figs. 1 to 3, the oil feed line, leading from any suitable fuel oil supply (not shown) is indicated at 30. This fuel supply conduit 30, generally a copper tubing of about ¼″ diameter has formed in or in communication with it, at a point adjacent the burner B, a coil 33; see Fig. 3. The end of this coil remote from the oil supply (with reference to the direction of flow) is continued as or connected to the pre-heated-oil delivery line 30a already mentioned in connection with Fig. 6. The pre-heating of the oil fuel is accomplished in said coil 33.

As best seen in Fig. 3, the coil 33 is disposed in a closed chamber or jacket 35 shown as of cylindrical form, see Fig. 5, having end walls or heads 36 and 37, through which the inlet and outlet connections for the coil with the fuel lines 30 and 30a, respectively, are extended in sealed condition.

The space within the inner chamber or jacket 35, externally of and surrounding the oil heating coil 33, is adapted to receive and circulate through it a portion of the heat-exchange medium of the radiation system associated with the boiler or furnace 10, such medium, as already noted, being hot water in the example selected for the purposes of illustration in the accompanying drawings. Accordingly, as best seen in Figs. 1 and 2, I provide a conduit for conducting hot water from the boiler to the inner compartment 35 of the conditioning device, chest or retort, the latter as a whole being indicated by the reference character C.

Such conduit may extend from any convenient point in a hot water circulation jacket or other compartment of the boiler or indeed may be comprised in a circuit separate from that of the radiation system, subject to heating in any convenient manner, as by the oil burner unit B of the furnace 10 or otherwise. As here shown an off-take conduit or pipe 38 is provided in communication with the outlet piping 16 for the heated water from the boiler, adjacent the riser pipe 17 of Figs. 1 and 2. It will be understood that the conditioning unit C may be disposed at any convenient location adjacent the furnace or boiler 10 and it is contemplated that in many instances, particularly in cases of initial equipment, as when a furnace is first installed in a newly constructed dwelling, that this conditioning unit C will be enclosed in or form a part of the furnace or boiler installation, so as to be enclosed in any exterior decorative or insulating casing for the heating or air-conditioning apparatus as a whole. In other instances, such as where my system and apparatus are to be employed in conjunction with a previously installed burner and heating mechanism, the conditioning unit C will be disposed at the most conveniently available location adjacent the boiler, as upon the cellar flooring, substantially as represented in Figs. 1 and 2. In the illustrated example the hot water conduit 38 accordingly has an extension 39 in this instance directed downwardly and disposed to communicate with an inlet 40 on a wall of the inner compartment 35, herein the rear end wall 37.

Desirably temperature-responsive c o n t r o l means is provided in association with the hot water conduit at some point between the heat source and the conditioning unit C. Where, as in the illustrated example, the domestic or other hot water supply is afforded from the same apparatus which supplies the heating medium for the radiation system, such temperature-responsive means may also serve as the control for the heating of such hot water supply. Accordingly, as best seen in Figs. 1 and 2, the hot water conduit 39 is operatively associated with a water supply heater unit 41. This may be of the known type such as commonly installed for example with the Timken equipment previously referred to. Cool water from the main is supplied to this unit as through the supply pipe 42, the heated water being carried by a piping connection such as 43 to the various points of use in the dwelling or other building. Such unit has incorporated with it a thermostatic switch 44, for example as known by the trade name "aqua-therm," disposed in the electric circuit of the burner unit B and adjusted to switch off the burner whenever the water passing from the boiler through the pipe 39 reaches a predetermined maximum temperature, say in the vicinity of 150° F. In any event the thermostatic control setting is such, under my invention, that the oil in the pre-heater coil 33 can at no time acquire a temperature above 160° F. or whatever is the vaporization point of the particular fuel.

Leading from a portion of the oil-heating hot-water compartment or inner chamber 35 remote from the inlet 40, herein at the front or end wall 36, is a return water conduit or pipe 45, whereby the water after passing about the coil 33 is reconveyed to the boiler 10, as by connection with one tion of the burner fan or air impeller. Said admixture, still heated, serves in effect to pre-heat the air for supporting combustion and otherwise improve the efficiency of the combustive action.

Referring to Figs. 1 to 4, a conduit 71 for said humidified and otherwise conditioned gaseous admixture leads out from the main compartment 62, at a point remote from the admission port 63 for the combustion gases, herein in the opposite end wall of said main compartment. Such piping or conduit 71 includes appropriate connections or unions 72, 72, preferably of a non-abrupt angular character as referred to in connection with the gas conduit 60. The conduit 71 is continued through an opening 73 at the base of the furnace and admitting to the pit 21 at any convenient point, said conduit including a riser pipe 74 extending up through the combustion chamber flooring 20 and having at its upper end the directive outlet or discharge element 70 previously mentioned. As best seen in Figs. 4 and 6 said element comprises an elbow which may be angularly adjusted upon the riser 74 so as to direct the heated gaseous discharge to the most efficient angle relative to the vanes 29 of the rotary air impeller 27—29 of the burner unit.

As above stated, said gaseous mixture outlet 70 is located in such proximity to the air impeller, whether of the rotary type of burner of Fig. 6 or the gun type of Fig. 7, as to be subject to the impelling or draft action. Desirably also, as here shown in Figs. 4 and 6, the air-moving blades or vanes 29 are of such area, generally somewhat larger than customary for the particular burner without my installation, and the blade construction and arrangement, particularly as to angular position with relation to the outlet 70, are made such as to insure a substantial or augmented impelling or draft action at said discharge outlet 70. Such effect is made adequate, in consideration of and in proportion to the entire apparatus of my system, to create a draft action back through the gas conduit 70, the conditioning unit C and the downleading gas conduit 60 continuously to the gas trap 50 within the stack, whereby during operation of the burner a continuous flow of the trapped gases of combustion is maintained from the stack to the combustion region.

Preferably I provide means for controlling the force of this draft action. Herein, as best seen in Fig. 1, I have installed in the gas conduit 71 a manually adjustable valve 75, closing of which to a greater or lesser extent serves to vary and set the force of draft as appropriate to the particular installation and conditions. Or if at any time the exhaust-gas-utilizing and air-pre-heating portion of my apparatus should be desired to be temporarily not employed, this may be accomplished by shutting off said valve 75 completely.

The gas supply line 71 may also conveniently be provided with an inspection and regulating port such for example as the cup or trap 76 connected in the conduit 71 and having a removable closure or cap 77; see particularly Fig. 1. By loosening or removing the cap 77 the character and force of the gaseous flow through the conduit 71 may be examined, for test and regulatory purposes. Said receptacle 76 may also serve to retain possible condensate produced within the relatively short length of conduit 71 between the boiler and the conditioning unit C, as may occasionally take place under conditions of extreme atmospheric humidity. Any excess accumulation of such condensate may be relieved as by means of a bleeder aperture 78 at a low point in the conduit 71, also as best seen in Fig. 1.

Such bleeder aperture serves also for the admission and admixture with the gaseous flow to the burner of an additional amount of atmospheric air as may be found desirable for increasing the oxygen content. For the same purpose, one or more other air inlets may also be provided in the conduit 71, either adjacent the bleeder aperture 78 or elsewhere, for example as indicated at 79 in Figs. 1, 2 and 4. Such air inlet apertures generally have a diameter of about ¼ inch, depending somewhat upon the draft conditions at the particular installation the size being reduced to approximately 1/16 inch under exceptionally drafty basement conditions. In a similar connection it may also here be noted the supplemental or other air inlet ducts adjacent the combustion point, such for example as represented at 20a and 31 in Fig. 6 and others, are desirably of ¾ inch diameter, again dependent in some measure on the given circumstances. It will be seen that in either the rotary type of Fig. 6 or the gun type of Fig. 7 that a plurality of such air supply ducts within the fire box are provided, at lower and upper levels respectively, one supplying air adjacent the lower portion of the flame and the other to the upper portion. For example, the upper air inlet 31 of Figs. 1 to 6 has a length above the floor of the combustion chamber of approximately five inches, thereby extending it to and delivering the air at the desired level in connection with a burner of the character there illustrated. Aside from the provision of such auxiliary air supply, little or no modification of existing types of burners is required, other than a modification of the fan or air impeller or enlargement and rearrangement of its blades in combination with the gas discharge conduit to afford the described circulation and recirculation of gases. A possible further exception, in view of the higher temperatures developed with my apparatus, may be a somewhat heavier and more heat resistant insulation for the burner electrodes. As in any instance, it is recommended that the burner nozzle be inspected periodically.

As above stated, the supplying of the recirculated combustion gases and pre-heated air may temporarily be shut off when desired, as by means of the valve 75. At such time the pre-heating of the fluid fuel may be continued, or at such or other desired time it also may temporarily be made nonoperative, merely by closing the shut-off valve 38a provided at any convenient point in the hot-water conduit 38; see Figs. 1 and 2. A similar valve may be disposed in the extension 39 of said hot water conduit, below the domestic water supply heater unit 41, in association with a valve controlled by-pass (not shown) communicating between said conduit 39 and the water return piping 19a. Thus when desired the water heating unit 41 may be operated without either or both the fuel and the air pre-conditioning means of the invention.

It will be understood that the degree of preheating of the oil or fluid fuel is regulated for maximum efficiency of combustion. The proper oil temperature in the delivery line 30 generally is found to lie in the range of about 120° to 145° F., depending somewhat on the particular circumstances of any given installation. The construction and arrangement of the preconditioning system as a whole and the incorporated conof the return pipes 19 of the radiation system previously mentioned; see particularly Fig. 4.

The invention further contemplates conditioning, including pre-heating of the air or the admixture of air and other gaseous matter which is supplied to the atomized or volatilized pre-heated fluid fuel and commingled with the latter to support and increase the efficiency of combustion at the burner.

Accordingly, as best seen in Figs. 1 and 1a, I provide means for trapping and taking off a quantity of the gases of combustion escaping from the burner and which otherwise would pass off through the breeching 11 and stack 12 to the flue 13. As shown by way of example such means herein comprises a collecting device or gas trap 50 disposed in the stack 12 at a position calculated to afford adequate draft maintenance. In the illustrated example said trap 50 is spaced somewhat above the breeching 11 and directly in the path of the gaseous combustion product travelling from the latter in the stack 12. The gas trap 50 is located in calculated relation to a thermostatic switch 12t disposed in the stack 12 and connected to shut off the burner at a predetermined stack temperature. As here illustrated, see particularly Fig. 1, the gas trap 50 is set in the stack beyond said thermoswitch 12t, that is, between the latter and the flue 13. I have found in actual practice that reliable control and otherwise efficient operation are had when the trap is arranged with its mouth approximately four to six inches vertically above this thermostatic control device 12t.

Said gas-trapping device 50 may be variously constructed. Desirably, as shown, it is of adjustable capacity, so that the quantity or proportion of gases to be caught and diverted to the conditioning unit C may be variably controlled and set to suit the conditions at any given installation. As represented this device comprises a main element or receiver 51 open at its lower and larger end 52 and decreasing in size toward its upper end 53, in the manner of an inverted cone. Its reduced upper end 53 is closed except for a laterally extending outlet or pipe 54 projecting through the wall of the stack 12 and herein affording the support thereon for the trap device.

The receiver or collecting element proper 51 of this gas trap 50 is so constructed and disposed that sufficient draft to the flue is readily afforded. Its downwardly open mouth 52 is spaced from contact with the surrounding wall of the stack. Further, said receiver or cone 51 is made perforate, over a substantial area of its lower portion, as by the series of perforations 55 of a size and total area calculated to preserve adequate draftage while accumulating and diverting the desired proportion of the combustion gases. In practice I have found that a multiplicity of perforations of approximately one-sixteenth of an inch in diameter and distributed around the skirt or main portion of the receiver 51 well serves the purpose. A spacing of about one inch between adjacent apertures is found suitable for most installations.

Any suitable means may be provided for variably adjusting the capacity of the trap 50. By way of example I have shown the skirt element 51 as split longitudinally upward from its mouth, as at 56, and said element is formed of a flexible metal or other heat-resistant sheet material such that the edges of the conical skirt along such split may be brought together into more or less overlapped relation or may be moved laterally out of such overlapping relation or even be spread and opened apart to adjustable extents, thereby in effect correspondingly changing the area of the trap mouth to the desired extent. Such adjustment may be performed by any suitable means such as an adjusting screw or rod 57 journalled on the stack 12 and having one or more threaded portions 58 operatively engaging a like number of lugs 59 on the split skirt 51. Turning of said adjusting rod, as by means of the manual adjusting knob 57a accordingly serves to move the split portions of the skirt toward or from each other and to hold them in adjusted position, to provide the appropriate area for the mouth of the trap.

The gas trap off-take or outlet 54 is connected at its outer end to a downwardly extending pipe or gas conduit 60 through piping connections 61, 61, etc., of a non-abrupt angular character, usually avoiding reverse bends, and of such direction and arrangement as to afford a free path of flow for the off-coming combustion gases. At its lower end the conductor 60 is extended inwardly through a wall, herein one end wall of the outer compartment 62 of the conditioning unit C. Within the latter the gas supply conductor 60 terminates in an admission port 63, set inwardly from the compartment wall and spaced above in a vertical plane with the inner chamber 35. Thus the gaseous combustion products, including any condensate that may be formed in the relatively cool gas conduit 60 are conveyed and admitted to the outer chamber or compartment 62 of the conditioning unit C. Such moisture of condensation developing at the discharge outlet 63 of the gas conduit in part falls to and accumulates at the lower portion of the main chamber 62 where it builds up to the level of or somewhat above the bottom of the inner chamber 35, under usual atmospheric conditions, and in part is vaporized or revaporized as below further explained. Desirably a gauge of the liquid level, as indicated at 62a in Figs. 1 and 2, is provided, in communication with the lower portion of the main compartment 62, as is also a temperature gauge or thermometer 62b for readily determining the temperature conditions within said main compartment or outer chest 62.

In the operation of the system, vaporization of moisture in the main chamber 62 normally takes place, both from the previously collected or then accumulating body of moisture above mentioned and also from the depositing condensation moisture from the incoming gases, at the admission port 63. Such incoming moisture falls onto the then heated wall of the inner compartment 35, some portion thereof being vaporized or revaporized, to commingle with the original air content and with the gaseous combustion products circulating about the main compartment 62, while the remaining portion thereof collects into the body or accumulation of moisture at the lower portion of the main chamber 62 as already above indicated. Thus the gaseous product conducted from the trap 50 to the conditioning unit C is there mixed with initial air in the tank and with moisture or water vapor, with some degree of cooling by transfer to the relatively cooler water-circulating and oil-pre-heating chamber 35.

This gaseous admixture thereafter is led from the main chamber of the conditioning unit C and is delivered to the oil burner unit B, at the discharge outlet 70 previously referred to in connection with Fig. 6, adjacent and subject to the actrol means are such that in no case will the temperature of the oil exceed about 150° F., leaving a safety factor of at least 10° below the critical temperature of approximately 160° F. As noted, the oil temperature may be variably controlled by means of the automatic temperature-responsive switch devices, including the thermoswitch 44 responsive to the temperature of the water en route to the unit C and the stack thermoswitch 12t subject to the temperature conditions adjacent the gas trap 50. Said stack thermoswitch 12t operates in the known manner, preferably in series with the relay coil of the motor switch device 30c, to stop the burner quickly in the event of a predetermined drop in stack temperature such as due to flame failure, also to cut off the burner in the event of undue continued rise in stack temperature above a selected degree. This device 12t desirably is of the type such as marketed under the name "Protectorelay" which is adapted to recycle in the event of flame failure, automatically giving the burner one chance to restart if other conditions are proper, but which does not permit the burner to deliver oil into a hot fire box until after a determined scavenger period for any accumulated gases and which period may be adjusted to suit the particular installation. If desired, means may be provided for readily visually determining the temperature in the outer compartment 62 of the conditioning unit C, such as the thermometer 62b, Figs. 1 and 2, mounted on said unit and subject to the heat condition in said compartment. It will also be understood that any and all of the controls or safety devices usual in an oil burner installation may be employed, including for example an automatic magnetic or other switch, relay or like device such as indicated at 30c at the lower left portion of Fig. 1 whereby the burner is completely shut off in the event of failure of the fuel supply.

As best seen in Fig. 3, the conditioning unit C is of simple construction, comprising essentially the inner and outer chambers or compartments 35 and 62 respectively. As here illustrated by way of example, the outer compartment, jacket or chest 62 is in the form of a cylindrical tank. It may be constructed of any suitable sheet material, preferably of a non-corrosive character, as are also the inner compartment or jacket 35 and any piping contacted by the gaseous combustion product. I have satisfactorily used for the purpose a non-corrosive 16-gauge sheet steel. For use with a domestic oil burner such as the Timken model C referred to, the capacity of the outer chest or compartment 62 need be but about 5 gallons.

It will be noted that the inner compartment 35 is disposed in spaced relation to the lateral walls of the outer compartment about its entire circumference but is nearer the bottom of the latter, leaving approximately the upper half portion free for circulation of the trapped gases of combustion. In the instance of a five-gallon outer tank, as referred to, the vertical spacing between the bottom portions of the two compartments generally is about 1½ to 2½ inches, thus providing ample space for the collection of moisture of condensation. If desired a drainage cock (not shown) may be provided in the lower wall of the outer compartment 62.

From the foregoing it will be apparent that the method and system of my invention involve in combination the pre-heating of the oil or other fluid fuel and a pre-heating of the air supplied to the region of combustion together with an admixture with that air of a calculated portion of the combustion gases, conditioned by conduction, condensation, circulation in a confined space, some cooling by useful heat transfer and by subjection to moisture in liquid and vapor form, some of which may be admixed with the gases, which also receive a proportion of atmospheric air. Such trapped combustion gases are thus conditioned, circulated and recirculated to and from the burner. The outer compartment of the conditioning unit C and the received gases serve at the same time to maintain the desired heated condition around the inner compartment and the fuel coil in the latter. While the preheating of the fuel in said coil 33 is directly effected by the hot water or other heating medium circulating from the boiler, there is also a mutual balancing and heat transferring or retransferring cooperation between the contents of the outer and inner compartments, including at times a booster effect upon the hot water or other fluid medium returning to the boiler.

The entire apparatus of my system, including the conditioning unit, the piping arrangements, the location of parts relative to the burner and the various features as illustrated and described are all calculated for cooperative interaction and function. For example, the length of the fuel or oil line 30 between its exit from the inner tank 35 and the burner itself or the switch 30c and the character of the pipe, preferably bare copper tubing of not less than about ⅜ of an inch in diameter, are such as to afford a predetermined temperature drop for the pre-heated fuel between the points mentioned. Thus it is assured that the fuel temperature remains below the prescribed maximum, say 150° F., particularly at times when the burner is starting or restarting after an inactive period, during which the oil or fuel in the coil of the conditioning unit may have attained a slightly higher temperature than with the burner in operation and the oil consequently flowing through the coil. This section of the oil conduit, in conjunction with the conditioning unit, also reduces or removes any tendency for the formation of air bubbles or "air lock" in the line behind the magnetic valve or control 30c and which in many burner installations not equipped with my apparatus may cause failure of the fuel supply or irregularity in the burner operation.

In connection with a burner of the rotary type such as here shown, wherein the fuel feed generally is by gravity from an elevated tank, ordinarily a retarding device or valve is necessary in the oil line adjacent the tank. My apparatus, among its numerous other and important advantages, makes any such retarding device unnecessary. This results from the construction and arrangement of the tubing coil in the inner chamber of the conditioning unit, said coil being of a length and number of turns and its tubing being of such diameter, for example ¼ inch, that the frictional resistance to the passage of oil through it affords a calculated retarding action, balancing the gravitational effect at the tank and hence affording the appropriate controlled rate of flow.

In accordance with the method and apparatus of my invention, there is attained under normal operation a materially closer approach to complete combustion of the fuel than in any commercial burner of which I am aware. Incidentally, it may here be noted that when initially starting from a completely cool status the burner system as here disclosed normally reaches its operating stage of maximum efficiency within a period of not more than about three minutes.

The remarkably improved combustion results are due to the combined effect of pre-heating not only the fuel but also the air for combustion while also mixing with it gases from the stack, conditioned as disclosed. And since a considerable part of the gaseous combustion product is returned for circulation and recirculation through the system, any unburned residue is constantly reduced. The total result is that even after an entire heating season little or no trace of soot is discernible in the boiler or stack.

This clean-burning action and the full utilization of the available heating units of the fuel have many attendant advantages. Perhaps the most prominent of these is the remarkable economy in fuel consumption. It is not necessary here to set out my complete records in that connection, and the following summarized figures for the same two-month period of November and December of 1938 and of 1939 respectively will show the typical results. The comparative operating tests were made with a Timken burner model C such as herein illustrated, used in said 1938 period without my economizing system and subsequently in said 1939 period equipped with my system as illustrated in Figs. 1 to 6 hereof by way of example.

This equipment was employed in the vicinity of Boston, Massachusetts in a nine-room dwelling having 880 cubic feet of hot-water radiation, the building being of frame construction and without special heat insulation at any point. The burner and hot water boiler were located in customary manner in the basement, the latter having a seven-foot height with but three feet below the ground. The hot-water piping in the basement was entirely uncovered. During the 1938 period the house temperature was maintained at 72° while during the corresponding 1939 period it was set at 74°, to insure absolute fairness in the comparative operations. Further, it is a matter of public record at the Boston offices of the U. S. Weather Bureau that the mean daily temperatures for the two-month 1938 period averaged substantially above the normal mean temperature, while during the corresponding 1939 period the reverse was true.

Despite these factors unfavorable to reduced oil consumption in 1939 as against 1938, actual consumption of fuel oil No. 2, stated within 5 gallons, was in the 1938 period 790 gallons, while in the corresponding two-month 1939 period, utilizing my system and method, it was but 570 gallons. This represents a fuel saving of 27.8 per cent, in the face of the adverse weather conditions.

Combustion tests of the described installation have been made by competent and disinterested heating engineers at intervals over a long period of use. One important item of such tests is the percentage of $CO_2$ in the stack, the figure of 15 being accepted as indicative of the maximum expectation. In all of these tests the $CO_2$ percentage for my apparatus under normal operation was never below the remarkable and heretofore commercially unexperienced range of 14.2 to 14.4. I am reliably advised that with the particular make and model of burner and boiler as here referred to, the average $CO_2$ percentage experienced has been about 9 and has never heretofore been known to exceed 12. Other data of the tests include a stack temperature seldom over about 590°, an average oxygen test figure of 1.2, and an average stack loss in per cent heat in oil figure of but 17. The test reports also invariably include the notation "No trace of soot in boiler." The flame at the burner is of the desired bluish-orange or sun-like character to which the term "turnasoling" is sometimes applied.

One objectionable condition commonly met in connection with oil burners is that of accumulation of fuel gas, that is, atomized or vaporized oil within the boiler. Over a period of time this fuel gas penetrates the walls of the ordinarily relatively porous cast iron boiler tubes and enters the radiation system. There it rises to the highest point, such as an upper floor or attic of a dwelling, where it forms a pocket, interfering with proper radiation and circulation of the heating medium. Some of this gas frequently escapes into the dwelling, with resultant disagreeable odor and unhealthful condition. Any such objectionable result is greatly reduced and substantially eliminated in the use of my invention, by reason of the more nearly perfect combustion obtained, with little or no remaining unspent fuel gas.

For similar reasons, a more healthful condition is maintained in the dwelling or other building employing the method and system of my invention, and in the same neighborhood of such building, again due to the greatly improved combustion. With the marked increase of $CO_2$ percentage already mentioned there is an attendant cutting down of any possible carbon monoxide and its accompanying dangers. And in addition the outside atmosphere adjacent the flue discharge and in its general vicinity is relieved of practically all the disagreeable odor and other objectionable effects associated with oil and petroleum fuels and commonly experienced in neighborhoods employing oil burners. Obviously also any likelihood of the accumulation of an oily film or deposit, sometimes referred to as scum, upon the inner walls and surfaces of the building is substantially eliminated. Thus a more healthful living condition is promoted both indoors and in the general neighborhood outdoors, as an important result of the liquid fuel or oil economizing system of my present invention.

In Fig. 7 I have sufficiently illustrated an installation of my apparatus in connection with an oil burner B' of the so-called gun type. The apparatus in general may be the same as in the preceding figures, and parts not otherwise mentioned may be as previously described. In Fig. 7 corresponding parts have similar reference numerals as in Figs. 1 to 6 with the addition of a prime mark.

The burner B' is installed at the base of the furnace or boiler 10' in the usual manner, with the delivery or combustion end of the "gun" or burner casing extending inwardly through an appropriate aperture in the front wall. The particular burner illustrated, merely by way of example, is of the type such as shown in U. S. Patents Nos. D. 98,726, 2,066,651, 2,084,709 and others of that general class. Such burner is equipped with a rotary air impeller, the shaft of which is indicated at 25'. The supply line for the pre-heated liquid fuel or oil is seen at 30a', the oil flow being had in the usual manner, generally under the action of an oil pump operated by the burner motor and not seen in Fig. 7, being behind the impeller casing. The reclaimed and conditioned combustion gases coming from the chest or conditioning unit C such as that of Fig. 3, with the admixed pre-heated air, are conducted through the conduit 71' and delivered directly adjacent and within the influence of the impeller, the return outlet or delivery end of the conduit being indicated at 70'. As in the preceding figures such outlet 70' is angularly disposed for maximum efficiency of pick up of the gases, insuring their delivery to the combustion point in admixture with the air ordinarily supplied by the impeller.

Within the fire box and above any flooring such as 20' for the combustion chamber, I provide one or more special air admission ducts, corresponding in general to the elements 20a and 31 of Fig. 6. Such air supply inlets are indicated in Fig. 7 at 80 and 81 respectively. Each has its outer end open to atmosphere at any convenient point outside the boiler or furnace 10', being here shown as extending inwardly through the front wall. One of said air supply ducts has its inner or air delivery end 80a disposed adjacent and below the flame or combustion point while the delivery end 81a of the other duct 81 also is adjacent the combustion region but herein above the flame of the burner. Thus an adequate supply of oxygen to support combustion is assured.

In Fig. 8 the method and apparatus of the system of my invention are diagrammatically illustrated in association with an internal combustion engine E. As there shown by way of example the conditioning unit C may be located at any convenient position, generally upon the frame or chassis of the automobile and preferably forward and fairly close to the engine. Its several conduit elements are connected respectively with the engine exhaust, with the water cooling system and with the fuel or gasoline supply line. Here again, corresponding elements may be the same as for example in Figs. 1 to 6, similar reference numerals being used, with the addition of double prime marks.

The gasoline or other fluid fuel from the supply is conducted through the piping 30" to and through the inner coil of the conditioning chest C and thence is delivered to the carbureter c in the usual manner. The water for pre-heating the fuel is conducted from any convenient point 16" upon the water jacket of the engine, such as at a bleeder plug as commonly provided for attachment of a hot-water heater, and passes through the piping 38" to the inner chamber of the conditioning unit C. From the latter it is carried by the return conduit 45" back to the water system of the engine, as for example at the return line 19" of the radiator r.

The gas trap 50" is installed in the engine exhaust line, herein within the muffler m or an extension thereof. The trapped gases are carried through the piping 60" to the outer chamber of the chest or tank C wherein they are conditioned and then delivered through the conduit 71" to the gas intake of the engine E, at some convenient point between the carbureter c and the intake manifold i; see Figs. 8a and 8b. In operation the system performs similarly as already described in connection with the burner installations.

It will be understood that my invention, either as to means or method, is not limited to the exemplary embodiment or steps herein illustrated or described, and I set forth its scope in my following claims.

I claim:

1. An economizing fluid-fuel heating system comprising, in combination with a fluid-fuel burner having an air-impelling device, a boiler and communicating stack for gases of combustion, and a fluid-medium radiation equipment: a conditioning unit including an inner compartment and a surrounding outer chamber; a tubing coil in said inner compartment in communication with a fluid-fuel supply and with a conduit adapted to deliver the fuel to the burner; piping connections between said inner compartment and the boiler for conducting heated fluid-medium from and returning it to the boiler; means in the stack for trapping a quantity of the gaseous combustion product of the burner; a conduit leading from said means and discharging into the outer chamber of said chest; and a further conduit communicating at one end with said outer chamber and at its other end having a discharge outlet adjacent and subject to the impelling device of the burner; said outer chamber adapted to store a quantity of moisture including condensate from the incoming trapped gases and to receive and condition the latter as to their heat and moisture content while affording mutual heat exchange between them and the fluid-medium and the fuel coil in the inner compartment.

2. An economizing fluid-fuel system according to claim 1 including means associated with the gas conduit for admixing atmospheric air with the gaseous mixture prior to discharge of the latter to the burner.

3. That method of fuel feeding and combustion which comprises the steps of establishing a heated condition for a fluid heating medium to be circulated, pre-heating a fluid fuel for combustion by conducting it in heat-receiving relation to a heated quantity of said heating medium, conducting said pre-heated fuel and burning it for the continued heating of said heating medium, conducting a portion of the resulting gases of combustion in segregated proximity to the fuel to be pre-heated in a manner providing for heat exchange between said gases and the heating medium and fuel to be pre-heated, and delivering said segregated gases so as to commingle them with the conducted pre-heated burning fuel.

4. That method of fuel feeding and combustion which comprises the steps of establishing a heated condition for a fluid heating medium to be circulated, pre-heating a fluid fuel for combustion by conducting it in heat-receiving relation to a heated quantity of said heating medium, conducting said pre-heated fuel and burning it for the continued heating of said heating medium, conducting a portion of the resulting gases of combustion in segregated proximity to the fuel to be pre-heated, effecting condensation of moisture from said gases, collecting said condensate and vaporizing a portion thereof in the presence of the segregated gases, and supplying the latter to and with the pre-heated fuel for combustion.

5. That method of fuel feeding and combustion which comprises the steps of establishing a heated condition for a fluid heating medium to be circulated, pre-heating a fluid fuel for combustion by conducting it in heat-receiving relation to a heated quantity of said heating medium, conducting said pre-heated fuel and burning it for the continued heating of said heating medium, conducting a portion of the resulting gases of combustion in segregated proximity to the fuel to be pre-heated, cooling, and admixing atmospheric air with, said segregated gases, and delivering the gaseous admixture for commingling with the conducted pre-heated burning fuel.

6. That method of fuel feeding and combustion which comprises the steps of establishing a heated condition for a fluid heating medium to be circulated, pre-heating a fluid fuel for combustion by conducting it in heat-receiving relation to a heated quantity of said heating medium, conducting said pre-heated fuel and burning it for the continued heating of said heating medium, conducting a portion of the resulting gases of combustion in segregated proximity to the fuel to be pre-heated, effecting condensation of moisture from said gases, collecting said condensate and vaporizing a portion thereof in the presence of the segregated gases, admixing atmospheric air with the latter, and supplying the resulting gaseous admixture to and commingling it with the conducted preheated burning fuel.

7. In combination with fluid fuel combustion apparatus discharging combustion gases, combustion conditioning means including a chamber for receiving a portion of the combustion gases and returning them with air pre-heated thereby to the combustion point, a second separate chamber in heat subject relation to the gases in the first chamber, means for circulating therethrough a fluid medium heated by the combustion apparatus, and a fluid fuel conduit from the fuel supply and extending through said heated medium in said second chamber to the combustion point for supplying the fluid fuel thereto in pre-heated condition.

8. Apparatus according to claim 7 wherein the conditioning means is associated with an oil burner of the rotary type in a heating furnace or boiler.

9. Apparatus according to claim 7 wherein the conditioning means is associated with an oil burner of the gun type in a heating furnace or boiler 10. Apparatus according to claim 7 wherein the conditioning means is associated with an internal combustion engine.

11. In an economizing system for fluid fuel combustion apparatus discharging combustion gases, a conditioning unit for pre-heating both the fuel and the air for combustion; said unit comprising an outer chamber, an inner chamber, means to circulate the fuel in segregated relation to and through the inner chamber, means to conduct a fluid heating medium to and from said inner chamber in pre-heating relation to the fuel passing through it, and means to trap and conduct to the outer chamber a portion of the combustion gases and to supply them, with admixed air pre-heated thereby, to the combustion point of said apparatus.

RAMÓN CASTRO JIMÉNEZ.